(12) United States Patent
Yamashita et al.

(10) Patent No.: US 10,642,178 B2
(45) Date of Patent: May 5, 2020

(54) TONER

(71) Applicant: CANON KABUSHIKI KAISHA, Tokyo (JP)

(72) Inventors: Daisuke Yamashita, Tokyo (JP); Yuichi Mizo, Toride (JP); Koh Ishigami, Abiko (JP); Masaharu Miura, Toride (JP); Takaho Shibata, Tokyo (JP); Takeshi Ohtsu, Toride (JP); Yosuke Iwasaki, Abiko (JP); Wakiko Katsumata, Kashiwa (JP); Hitoshi Sano, Matsudo (JP); Kenta Mitsuiki, Toride (JP); Takakuni Kobori, Toride (JP); Rei Hijikawa, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/377,591

(22) Filed: Apr. 8, 2019

(65) Prior Publication Data
US 2019/0339629 A1 Nov. 7, 2019

(30) Foreign Application Priority Data
May 1, 2018 (JP) .................. 2018-088149

(51) Int. Cl.
| G03G 9/08 | (2006.01) |
| G03G 9/087 | (2006.01) |
| C08G 63/183 | (2006.01) |
| C08G 63/16 | (2006.01) |

(52) U.S. Cl.
CPC ......... *G03G 9/08755* (2013.01); *C08G 63/16* (2013.01); *C08G 63/183* (2013.01)

(58) Field of Classification Search
CPC .................................................. G03G 9/08755
USPC ..................................................... 430/109.4
See application file for complete search history.

(56) References Cited

U.S. PATENT DOCUMENTS

| 3,853,778 | A | 12/1974 | Buckley et al. |
| 5,424,810 | A | 6/1995 | Tomiyama et al. |
| 5,464,722 | A | 11/1995 | Tomiyama et al. |
| 5,700,616 | A | 12/1997 | Kasuya et al. |
| 5,712,073 | A | 1/1998 | Katada et al. |
| 5,972,553 | A | 10/1999 | Katada et al. |
| 6,002,895 | A | 12/1999 | Kasuya et al. |
| 6,007,957 | A | 12/1999 | Kobori et al. |
| 6,156,471 | A | 12/2000 | Kobori et al. |
| 6,203,959 | B1 | 3/2001 | Tanikawa et al. |
| 6,235,441 | B1 | 5/2001 | Tanikawa et al. |
| 6,653,036 | B1 | 11/2003 | Tanikawa et al. |
| 6,670,087 | B2 | 12/2003 | Fujikawa et al. |
| 7,147,981 | B2 | 12/2006 | Fujikawa et al. |
| 7,279,262 | B2 | 10/2007 | Fujikawa et al. |
| 7,288,348 | B2 | 10/2007 | Hayami et al. |
| 7,396,626 | B2 | 7/2008 | Fujikawa et al. |
| 7,396,629 | B2 | 7/2008 | Baba et al. |
| 7,611,813 | B2 | 11/2009 | Ida et al. |
| 7,629,100 | B2 | 12/2009 | Okamoto et al. |
| 7,767,370 | B2 | 8/2010 | Ishigami et al. |
| 7,833,687 | B2 | 11/2010 | Kato et al. |
| 7,855,042 | B2 | 12/2010 | Kobori et al. |
| 7,858,283 | B2 | 12/2010 | Ishigami et al. |
| 7,927,775 | B2 | 4/2011 | Komatsu et al. |
| 7,939,233 | B2 | 5/2011 | Inoue et al. |
| 8,114,562 | B2 | 2/2012 | Ishigami et al. |
| 8,137,886 | B2 | 3/2012 | Baba et al. |
| 8,288,069 | B2 | 10/2012 | Fujikawa et al. |
| 8,298,742 | B2 | 10/2012 | Okamoto et al. |
| 8,323,726 | B2 | 12/2012 | Naka et al. |
| 8,697,327 | B2 | 4/2014 | Shibata et al. |
| 8,921,023 | B2 | 12/2014 | Baba et al. |
| 8,927,188 | B2 | 1/2015 | Naka et al. |
| 8,945,805 | B2 | 2/2015 | Baba et al. |
| 8,974,994 | B2 | 3/2015 | Kamae et al. |
| 8,986,914 | B2 | 3/2015 | Fujikawa et al. |
| 9,034,551 | B2 | 5/2015 | Endo et al. |
| 9,057,970 | B2 | 6/2015 | Ida et al. |
| 9,058,924 | B2 | 6/2015 | Komatsu et al. |
| 9,063,443 | B2 | 6/2015 | Ishigami et al. |
| 9,075,328 | B2 | 7/2015 | Minagawa et al. |
| 9,152,088 | B1 | 10/2015 | Kobori et al. |

(Continued)

FOREIGN PATENT DOCUMENTS

| JP | S56-013943 | 4/1981 |
| JP | 2015-045848 | 3/2015 |

(Continued)

OTHER PUBLICATIONS

Harasaki, "Coating Basics and Engineering" (Converting Technical Institute), (2010) p. 53 (discussed at specification paragraph No. [0038]).

(Continued)

*Primary Examiner* — Mark A Chapman
(74) *Attorney, Agent, or Firm* — Venable LLP

(57) ABSTRACT

A toner comprising a toner particle including a binder resin and a crystalline polyester resin, wherein the binder resin is an amorphous polyester resin having a linear alkyl group at a molecular chain terminal; the crystalline polyester resin is a polycondensate of a diol and a dicarboxylic acid; the number of carbon atoms $C_{aPES}$ of the linear alkyl group, the number of carbon atoms $C_{OH}$ of the diol, and the number of carbon atoms $C_{Ac}$ of the dicarboxylic acid, excluding carbon that belongs to carboxyl groups, satisfy the following relationships; and a glass transition temperature of the toner as measured by a differential scanning calorimeter is from 40.0° C. to 55.0° C.

$$8 \leq C_{aPES} \leq 20 \quad (1)$$

$$C_{Ac}/C_{OH} \geq 3.5 \text{ and } 0 \leq |C_{Ac} - C_{aPES}| \leq 3 \quad (2)$$

$$C_{OH}/C_{Ac} \geq 3.5 \text{ and } 0 \leq |C_{OH} - C_{aPES}| \leq 3 \quad (3)$$

4 Claims, No Drawings

(56) References Cited

U.S. PATENT DOCUMENTS

| | | |
|---|---|---|
| 9,261,806 B2 | 2/2016 | Moribe et al. |
| 9,341,970 B2 | 5/2016 | Yoshiba et al. |
| 9,348,247 B2 | 5/2016 | Ida et al. |
| 9,348,253 B2 | 5/2016 | Kanno et al. |
| 9,372,420 B2 | 6/2016 | Mizo et al. |
| 9,417,540 B2 | 8/2016 | Hashimoto et al. |
| 9,436,112 B2 | 9/2016 | Iwasaki et al. |
| 9,540,483 B2 | 1/2017 | Ida et al. |
| 9,651,883 B2 | 5/2017 | Hama et al. |
| 9,665,021 B2 | 5/2017 | Ohtsu et al. |
| 9,665,023 B2 | 5/2017 | Kamae et al. |
| 9,665,026 B2 | 5/2017 | Iwasaki et al. |
| 9,671,707 B2 | 6/2017 | Minagawa et al. |
| 9,696,644 B2 | 7/2017 | Ida et al. |
| 9,897,934 B2 | 2/2018 | Tamura et al. |
| 9,915,885 B2 | 3/2018 | Katsumata et al. |
| 9,969,834 B2 | 5/2018 | Ohtsu et al. |
| 10,012,918 B2 | 7/2018 | Ishigami et al. |
| 10,012,921 B2 | 7/2018 | Kamae et al. |
| 10,036,970 B2 | 7/2018 | Kanno et al. |
| 10,078,281 B2 | 9/2018 | Ida et al. |
| 10,082,743 B2 | 9/2018 | Hama et al. |
| 10,088,765 B2 | 10/2018 | Miyakai et al. |
| 10,133,201 B2 | 11/2018 | Kamae et al. |
| 10,146,146 B2 | 12/2018 | Komatsu et al. |
| 10,175,595 B2 | 1/2019 | Onozaki et al. |
| 10,197,936 B2 | 2/2019 | Onozaki et al. |
| 10,203,619 B2 | 2/2019 | Yamashita et al. |
| 10,216,108 B2 | 2/2019 | Iwasaki et al. |
| 10,228,629 B2 | 3/2019 | Tamura et al. |
| 10,234,777 B2 | 3/2019 | Ohtsu et al. |
| 2009/0233212 A1 | 9/2009 | Fujikawa et al. |
| 2010/0028796 A1 | 2/2010 | Nakamura et al. |
| 2010/0183971 A1 | 7/2010 | Fujikawa et al. |
| 2012/0214097 A1 | 8/2012 | Naka et al. |
| 2013/0108955 A1 | 5/2013 | Shibata et al. |
| 2013/0244159 A1 | 9/2013 | Ishigami et al. |
| 2013/0288173 A1 | 10/2013 | Hashimoto et al. |
| 2013/0309603 A1 | 11/2013 | Takahashi et al. |
| 2014/0134535 A1 | 5/2014 | Baba et al. |
| 2014/0137428 A1 | 5/2014 | Takenaka et al. |
| 2014/0329176 A1 | 11/2014 | Kanno et al. |
| 2015/0003875 A1 | 1/2015 | Ishigami et al. |
| 2015/0099227 A1 | 4/2015 | Ida et al. |
| 2016/0109820 A1 | 4/2016 | Hashimoto et al. |
| 2017/0315463 A1 | 11/2017 | Onozaki et al. |
| 2017/0343911 A1 | 11/2017 | Hashimoto et al. |
| 2018/0259867 A1 | 9/2018 | Sano et al. |
| 2018/0275540 A1 | 9/2018 | Matsuo et al. |
| 2018/0314176 A1 | 11/2018 | Ikeda et al. |
| 2018/0348656 A1* | 12/2018 | Kondo ............... G03G 9/08795 |

FOREIGN PATENT DOCUMENTS

| | | |
|---|---|---|
| JP | 2015-045851 | 3/2015 |
| JP | 2018-059964 | 4/2018 |

OTHER PUBLICATIONS

U.S. Appl. No. 16/203,864, Takeshi Ohtsu, filed Nov. 29, 2018.
U.S. Appl. No. 16/358,919, Yuto Onozaki, filed Mar. 20, 2019.

* cited by examiner

TONER

BACKGROUND OF THE INVENTION

Field of the Invention

The present invention relates to a toner for use in an electrophotographic system.

Description of the Related Art

Heat fixing methods, in which a toner image formed on an image forming member by development is transferred to a recording medium such as paper and is then applied with heat, are generally used in an electrophotographic method. Among the heat fixing methods, a fixing method using a heating roller as a heating means has been widely used in recent years due to good heat transfer efficiency.

With the recent expansion of electrophotographic market, the number of cases where toners are stored or used in various environments has been increasing. Therefore, it is sometimes required that toner particles create no blocking by fusing together even in a high-temperature environment where the temperature is not controlled.

It has been suggested to use a polyester resin having a high softening temperature as a means for improving the blocking resistance. However, when a resin having a high softening temperature is used, the low-temperature fixability of the toner is lowered.

Thus, in Japanese Examined Patent Publication No. S56-13943, Japanese Patent Application Publication No. 2015-045851 and Japanese Patent Application Publication No. 2015-045848, a technique of using a crystalline polyester resin having a sharp melt property in which the viscosity drops significantly when the melting point is exceeded has been suggested as a means for achieving both blocking resistance and low-temperature fixability.

SUMMARY OF THE INVENTION

However, in a toner using a crystalline plasticizer, a compatible state of a binder resin and the plasticizer is often maintained in the toner melt constituting the fixed image. For this reason, the heat resistance of the toner deteriorates, and the fixed image sometimes adheres to the rear surface of the outputted paper or another fixed image, which may result in image loss. This image defect is referred to as adhesion of ejected paper.

In particular, in the case of double-sided printing, since the fixed image portions inevitably come into contact with each other, image defects are more likely to occur than in the case of single-side output.

By lowering the compatibility between the crystalline plasticizer and the binder resin, it is possible to recrystallize the crystalline plasticizer after fixing and improve the heat resistance of the fixed image, but since the diffusibility of the plasticizer into the binder resin decreases at the time of fixing, the low-temperature fixability of the toner deteriorates.

In view of the above, the present invention provides a toner that excels in resistance to adhesion of ejected paper while maintaining low-temperature fixability and blocking resistance.

In the present invention, the ratio of the number of carbon atoms of a diol and the number of carbon atoms of a dicarboxylic acid, excluding carbon that belongs to carboxyl groups, that constitute the crystalline polyester resin, which is a plasticizer, is controlled. As a result, it is possible to achieve appropriate phase separation property between the plasticizer and the binder resin and diffusibility of the plasticizer in the binder resin.

Further, in the present invention, the number of carbon atoms of a linear alkyl group present at the end of the binder resin and the number of carbon atoms of the diol or dicarboxylic acid constituting the crystalline polyester resin are in a specific relationship. As a result, recrystallization of the crystalline polyester can be promoted.

That is, the present invention provides a toner comprising a toner particle including a binder resin and a crystalline polyester resin, wherein the binder resin is an amorphous polyester resin having a linear alkyl group at a molecular chain terminal, the crystalline polyester resin is a polycondensate of a diol and a dicarboxylic acid, where the number of carbon atoms of the linear alkyl group is denoted by $C_{aPES}$, the number of carbon atoms of the diol is denoted by $C_{OH}$, and the number of carbon atoms of the dicarboxylic acid, excluding carbon that belongs to carboxyl groups, is denoted by $C_{Ac}$, the $C_{aPES}$, the $C_{OH}$, and the $C_{Ac}$ satisfy the following relationships (1), and (2) or (3), and a glass transition temperature of the toner as measured by a differential scanning calorimeter is from 40.0° C. to 55.0° C.

$$8 \leq C_{aPES} \leq 20 \quad (1)$$

$$C_{Ac}/C_{OH} \geq 3.5 \text{ and } 0 \leq |C_{Ac} - C_{aPES}| \leq 3 \quad (2)$$

$$C_{OH}/C_{Ac} \geq 3.5 \text{ and } 0 \leq |C_{OH} - C_{aPES}| \leq 3 \quad (3)$$

According to the present invention, it is possible to provide a toner that excels in resistance to adhesion of ejected paper while maintaining low-temperature fixability and blocking resistance.

Further features of the present invention will become apparent from the following description of exemplary embodiments.

DESCRIPTION OF THE EMBODIMENTS

In the present invention, the expression "from XX to YY" or "XX to YY" representing the numerical range means a numerical range including a lower limit and an upper limit, which are endpoints unless, otherwise specified.

Further, the monomer unit refers to a reacted form of a monomer substance in a polymer or a resin.

The crystalline resin is a resin in which an endothermic peak is observed in differential scanning calorimetry (DSC).

The present invention provides a toner comprising a toner particle including a binder resin and a crystalline polyester resin, wherein the binder resin is an amorphous polyester resin having a linear alkyl group at a molecular chain terminal, the crystalline polyester resin is a polycondensate of a diol and a dicarboxylic acid, where the number of carbon atoms of the linear alkyl group is denoted by $C_{aPES}$, the number of carbon atoms of the diol is denoted by $C_{OH}$, and the number of carbon atoms of the dicarboxylic acid, excluding carbon that belongs to carboxyl groups, is denoted by $C_{Ac}$, the $C_{aPES}$, the $C_{OH}$, and the $C_{Ac}$ satisfy the following relationships (1), and (2) or (3), and a glass transition temperature of the toner as measured by a differential scanning calorimeter is from 40.0° C. to 55.0° C.

$$8 \leq C_{aPES} \leq 20 \quad (1)$$

$$C_{Ac}/C_{OH} \geq 3.5 \text{ and } 0 \leq |C_{Ac} - C_{aPES}| \leq 3 \quad (2)$$

$$C_{OH}/C_{Ac} \geq 3.5 \text{ and } 0 \leq |C_{OH} - C_{aPES}| \leq 3 \quad (3)$$

As a result of using a crystalline polyester resin as a plasticizer, the toner can maintain good resistance to adhesion of ejected paper while ensuring both low-temperature fixability and blocking resistance adhesion.

The binder resin and the crystalline polyester resin of the toner are compatible with each other and form a toner melt under heat-pressure fixation. When the crystalline polyester resin is recrystallized in the process of cooling the melt, the glass transition temperature of the melt becomes higher as compared with the state in which the binder resin and the crystalline polyester resin are compatible. It is conceivable that this results in increased heat resistance of the fixed image and improved resistance to adhesion of ejected paper.

The recrystallization of the crystalline polyester resin is possible without lowering the low-temperature fixability presumably for the following reason.

When the ratio of the number of carbon atoms of the diol and the number of carbon atoms of the dicarboxylic acid, excluding carbon belonging to the carboxyl groups, which constitute the crystalline polyester resin, is within the above range, a segment derived from a monomer with a small number of carbon atoms is copresent with a segment derived from a monomer with a large number of carbon atoms.

The segment derived from a monomer having a small number of carbon atoms has high polarity due to a short distance between the ester bonds and is highly diffusible in the amorphous polyester resin as a binder resin, thereby facilitating the demonstration of a plasticizing effect and contributing to an improvement in low-temperature fixability.

Meanwhile, the segment derived from a monomer having a large number of carbon atoms has low polarity and high phase separation property with respect to the amorphous polyester resin as a binder resin. Therefore, where a nucleating agent serving as a crystal nucleus is present in the vicinity when cooling from the compatible state of the toner melt, crystal nucleation can be rapidly induced.

That is, the $C_{aPES}$, the $C_{OH}$, and the $C_{Ac}$ satisfy the relationship (1), and (2) or (3).

Here, from the viewpoint of the demonstration of a plasticizing effect and phase separation property, $(C_{Ac}/C_{OH})$ or $(C_{OH}/C_{Ac})$ is preferably 4.0 or more, and more preferably 4.5 or more. From the viewpoint of diffusibility to the amorphous polyester resin, the ratios are preferably 9.0 or less, and more preferably 8.0 or less.

Meanwhile, from the viewpoint of structural similarity, $|C_{Ac}-C_{aPES}|$ or $|C_{OH}-C_{aPES}|$ is preferably from 0 to 2, and more preferably from 0 to 1, and $C_{Ac}=C_{aPES}$ or $C_{OH}=C_{aPES}$ is more preferable.

The above numerical ranges can be arbitrarily combined.

That is, it is particularly preferable that the $C_{aPES}$, the $C_{OH}$, and the $C_{Ac}$ satisfy the following relationships (1), and (2)' or (3)'.

$$8 \leq C_{aPES} \leq 20 \quad (1)$$

$$C_{Ac}/C_{OH} \geq 3.5 \text{ and } C_{Ac} = C_{aPES} \quad (2)'$$

$$C_{OH}/C_{Ac} \geq 3.5 \text{ and } C_{OH} = C_{aPES} \quad (3)'$$

The binder resin is an amorphous polyester resin having a linear alkyl group having 8 to 20 carbon atoms at the molecular chain terminal. The number of carbon atoms of the linear alkyl group is preferably from 8 to 16.

Since the linear alkyl group is present at the molecular chain terminal of the binder resin, it is conceivable that these groups are uniformly present in the toner melt. In addition, the linear alkyl group has high structural similarity to the segment derived from a monomer having a large number of carbon atoms in the crystalline polyester resin, and functions as a nucleating agent to form a crystal nucleus. As a result, it is conceivable that the crystal nuclei uniformly present in the toner melt promote the recrystallization of the crystalline polyester resin and improve the resistance to adhesion of ejected paper.

The binder resin is not particularly limited as long as it is an amorphous polyester resin having a linear alkyl group having 8 to 20 carbon atoms at the molecular chain terminal, and conventional resins suitable as a binder resin for a toner can be used. Further, the binder resin may include a resin other than the amorphous polyester resin and the crystalline polyester resin to such an extent that the effect of the present invention is not impaired.

It is preferable that the amorphous polyester resin be a polycondensate of a carboxylic acid and an alcohol having an aromatic diol as a main component.

An alcohol having an aromatic diol as a main component is an alcohol having an aromatic diol amount of 50 mol % or more in all the alcohols constituting the amorphous polyester resin, other than the below-described monoalcohol to be condensed to form a molecular chain terminal.

The aromatic diol used in the amorphous polyester resin is not particularly limited, and examples thereof include a bisphenol derivative represented by a following formula (A) and a diol represented by a following formula (B).

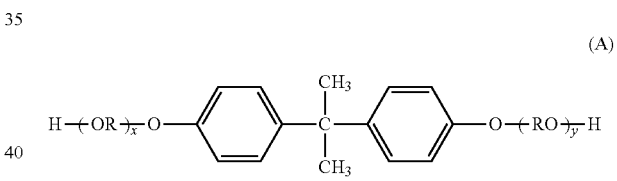

(A)

In the formula, R represents an ethylene group or a propylene group, x and y are each an integer of 1 or more, and the average value of x+y is 2 to 7.

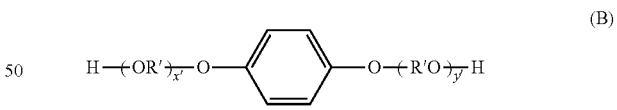

(B)

(in the formula, R' is

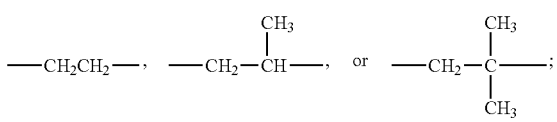

x' and y' are each an integer of 0 or more; and the average value of x'+y' is 0 to 10).

Examples of the bisphenol derivative represented by the above formula (A) are presented hereinbelow.

Polyoxypropylene (2.2)-2,2-bis(4-hydroxyphenyl)propane, polyoxypropylene (3.3)-2,2-bis(4-hydroxyphenyl)

propane, polyoxyethylene (2.0)-2,2-bis(4-hydroxyphenyl) propane, polyoxypropylene (2.0)-polyoxyethylene (2.0)-2,2-bis (4-hydroxyphenyl)propane, polyoxypropylene (6)-2,2-bis(4-hydroxyphenyl)propane and the like.

Examples of alcohols other than the bisphenol derivatives represented by the formula (A) and the diols represented by the formula (B) are presented hereinbelow.

Ethylene glycol, diethylene glycol, triethylene glycol, 1,2-propanediol, 1,3-propanediol, 1,4-butanediol, neopentyl glycol, 1,4-butenediol, 1,5-pentanediol, 1,6-hexanediol, 1,4-cyclohexane dimethanol, dipropylene glycol, polyethylene glycol, polypropylene glycol, polytetramethylene glycol, sorbit, 1,2,3,6-hexanetetrol, 1,4-sorbitan, pentaerythritol, dipentaerythritol, tripentaerythritol, 1,2,4-butanetriol, 1,2,5-pentanetriol, glycerin, 2-methylpropanetriol, 2-methyl-1,2,4-butanetriol, trimethylolethane, trimethylolpropane, 1,3,5-trihydroxymethylbenzene and the like.

These can be used singly or in combination of two or more thereof.

As described above, the main component of the alcohol is preferably an aromatic diol.

Further, in the alcohols, the amount of the aromatic diol in all the alcohols constituting the amorphous polyester resin, other than the below-described monoalcohol to be condensed to form a molecular chain terminal, is from 80 mol % to 100 mol %, and more preferably from 90 mol % to 100 mol %.

Examples of the carboxylic acid to be used in the amorphous polyester resin are presented hereinbelow.

Examples of the divalent carboxylic acid include maleic acid, fumaric acid, citraconic acid, itaconic acid, glutaconic acid, phthalic acid, isophthalic acid, terephthalic acid, succinic acid, adipic acid, sebacic acid, azelaic acid, malonic acid and the like. Of these, maleic acid, fumaric acid and terephthalic acid are preferable.

Examples of the trivalent or higher carboxylic acid are presented hereinbelow. 1,2,4-benzenetricarboxylic acid, 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylene carboxypropane, 1,2,4-cyclohexanetricarboxylic acid, tetra (methylenecarboxyl)methane, 1,2,7,8-octane tetracarboxylic acid, pyromellitic acid, Empol trimer acid, acid anhydrides or lower alkyl esters thereof, and the like.

Of these, 1,2,4-benzenetricarboxylic acid (that is, trimellitic acid) or a derivative thereof is preferable because of low cost and easiness of reaction control.

These divalent carboxylic acids and trivalent or higher carboxylic acids can be used singly or in combination of two or more thereof.

It is preferable that the main component of the carboxylic acid constituting the amorphous polyester resin be a dicarboxylic acid.

Here, the main component means a case where the amount of the dicarboxylic acid in all the carboxylic acids constituting the amorphous polyester resin is 50 mol % or more.

In the carboxylic acids, the amount of the dicarboxylic acid in all the carboxylic acids constituting the amorphous polyester resin, other than the below-described monocarboxylic acid to be condensed to form a molecular chain terminal, is from 80 mol % to 100 mol %, and more preferably from 90 mol % to 100 mol %.

The amorphous polyester resin is preferably a resin having a molecular chain terminal obtained by condensation of at least one linear alkyl compounds selected from the group consisting of a linear alkyl monocarboxylic acid having 9 to 21 carbon atom and a linear alkyl monoalcohol having 8 to 20 carbon atoms.

When a carboxyl group is present at the molecular chain terminal of the amorphous polyester resin before the linear alkyl compound is condensed, a condensation reaction with a linear alkyl monoalcohol occurs.

Meanwhile, when a hydroxyl group is present at the molecular chain terminal of the amorphous polyester resin before the linear alkyl compound is condensed, a condensation reaction with a linear alkyl monocarboxylic acid occurs.

Therefore, the molecular chain terminal is a group formed by detachment of the hydrogen atom of the hydroxyl group of the linear alkyl monoalcohol, or a group formed by detachment of the hydrogen atom of the carboxyl group of the linear alkyl monocarboxylic acid. Further, in this case, the linear alkyl group means an alkyl group included in a group formed by detachment of a hydrogen atom of the hydroxyl group of the linear alkyl monoalcohol, or in a group formed by detachment of the hydrogen atom of the carboxyl group of the linear alkyl monocarboxylic acid.

However, when the linear alkyl group is derived from a linear alkyl monocarboxylic acid, the number of carbon atoms $C_{aPES}$ of the linear alkyl group refers to the number of carbon atoms excluding carbon that belongs to the carboxyl group of the linear alkyl monocarboxylic acid.

Further, when the amorphous polyester resin has a branched chain, the molecular chain terminal is also inclusive of the terminal of the branched chain.

In the case where a linear alkyl segment having 8 to 20 carbon atoms is present in the main chain of the amorphous polyester resin, compatibility between the amorphous polyester resin and the crystalline polyester resin is enhanced. Therefore, in some cases, recrystallization of the crystalline polyester resin in the toner melt may be inhibited.

However, when a linear alkyl group having 8 to 20 carbon atoms is present at the molecular chain terminal of the amorphous polyester resin, affinity with the crystalline polyester resin becomes higher than at the main chain only in the vicinity of the molecular chain terminal.

As a result, the linear alkyl group functions as a nucleating agent serving as a crystal nucleus because of its structural similarity and promotes recrystallization of the crystalline polyester resin, thereby improving the resistance to adhesion of ejected paper.

Examples of the linear alkyl monocarboxylic acid having 9 to 21 carbon atoms are presented hereinbelow.

Pelargonic acid (nonanoic acid), capric acid (decanoic acid), undecylic acid, lauric acid (dodecanoic acid), tridecylic acid, myristylic acid (tetradecanoic acid), pentadecylic acid, palmitic acid (hexadecanoic acid), margaric acid (heptadecanoic acid), stearic acid (octadecanoic acid), nonadecylic acid, arachidic acid (icosanoic acid), and heneicosylic acid.

Meanwhile, examples of the linear alkyl monoalcohol having 8 to 20 carbon atoms are presented hereinbelow.

1-Octanol (capryl alcohol), 1-nonanol (pelargon alcohol), decyl alcohol (decanol), undecanol, lauryl alcohol (dodecanol), tridecanol, myristyl alcohol (tetradecanol), pentadecanol, palmityl alcohol (hexadecanol), heptadecanol, stearyl alcohol (octadecanol), nonadecanol, arachidyl alcohol (icosanol).

The amorphous polyester resin can be produced according to a usual polyester synthesis method. For example, the carboxylic acid monomer and the alcohol monomer are esterified or transesterified. Then, the desired polyester resin can be obtained by conducting a polycondensation reaction according to a conventional method under reduced pressure or by introducing nitrogen gas.

However, where the linear alkyl monocarboxylic acid or the linear alkyl monoalcohol serving as the molecular chain terminal is simultaneously present during the reaction of the carboxylic acid monomer and the alcohol monomer, the linear alkyl compound forms the molecular chain terminal. This terminal may play a role of an end cap and the molecular chain may become extremely short. Therefore, the linear alkyl compound may be added to the reaction system after the reaction between the carboxylic acid monomer and the alcohol monomer has advanced.

The above-mentioned esterification or transesterification reaction can be carried out using, as necessary, a usual esterification catalyst or transesterification catalyst such as sulfuric acid, titanium butoxide, dibutyltin oxide, tin 2-ethylhexanoate, manganese acetate, magnesium acetate and the like.

The polycondensation reaction can be carried out using a usual conventional polymerization catalyst, for example, titanium butoxide, dibutyltin oxide, tin 2-ethylhexanoate, tin acetate, zinc acetate, tin disulfide, antimony trioxide, germanium dioxide and the like. The polymerization temperature and the amount of the catalyst are also not particularly limited, and may be determined as appropriate.

As indicated hereinabove, the number of carbon atoms of the linear alkyl compound (in the case of the linear alkyl monocarboxylic acid, the number of carbon atoms excluding carbon that belongs to the carboxyl group) is from 8 to 20.

When the number of carbon atoms falls within the above range, the compound can act as a nucleating agent for crystal nuclei of the crystalline polyester resin, and the resistance to adhesion of ejected paper is improved.

Further, hydrophobicity of the molecular chain terminal is adequate as compared with the main chain of the amorphous polyester resin, the aggregation of the molecular chain terminals can be suppressed, the distribution of segments serving as nucleating agents for the recrystallization of the crystalline polyester resin becomes uniform, and the resistance to adhesion of ejected paper is improved.

The amount of the at least one monomer unit derived from a linear alkyl compound that are selected from the group consisting of a monomer unit derived from a linear alkyl monocarboxylic acid having 9 to 21 carbon atoms and a monomer unit derived from a linear alkyl monoalcohol having 8 to 20 carbon atoms in all the monomer units constituting the amorphous polyester resin is preferably from 2 mol % to 12 mol %, and more preferably from 4 mol % to 8 mol %.

The amount of the monomer unit derived from the linear alkyl monocarboxylic acid having 9 to 21 carbon atoms in all the monomer units derived from the carboxylic acids and constituting the amorphous polyester resin is from 2 mol % to 12 mol %, and more preferably from 4 mol % to 8 mol %.

Meanwhile, the amount of the monomer unit derived from the linear alkyl monoalcohol having 8 to 20 carbon atoms in all the monomer units derived from the alcohols and constituting the amorphous polyester resin is from 2 mol % to 12 mol %, and more preferably from 4 mol % to 8 mol %.

From the viewpoint of blocking resistance and low-temperature fixability, the glass transition temperature (Tg) of the toner as measured by the differential scanning calorimeter is from 40.0° C. to 55.0° C., and preferably from 42.0° C. to 53.0° C.

From the viewpoint of attaining the aforementioned glass transition temperature of the toner, the glass transition temperature (Tg) of the amorphous polyester resin measured by a differential scanning calorimeter is preferably from 40.0° C. to 80.0° C., and more preferably from 45.0° C. to 70.0° C.

A softening point (Tm) of the amorphous polyester resin is preferably from 70.0° C. to 150.0° C., more preferably from 80.0° C. to 140.0° C., and still more preferably from 80.0° C. to 130.0° C.

When the softening point (Tm) is within the above range, it is possible to satisfactorily achieve both blocking resistance and offset resistance. Furthermore, suitable penetration of the melted component of the fixed toner into the paper at high temperature is achieved and satisfactory surface smoothness can be obtained.

The amorphous polyester resins may be used singly or in combination of two or more thereof.

Further, from the viewpoints of low-temperature fixability and hot offset resistance, the weight average molecular weight (Mw) of the amorphous polyester resin is preferably from 6500 to 13000.

The toner particle includes a crystalline polyester resin. The crystalline polyester resin is a polycondensate of a diol and a dicarboxylic acid.

A clear endothermic peak is observed in differential scanning calorimetry of the crystalline polyester resin using a differential scanning calorimeter (DSC).

The melting point of the crystalline polyester resin is preferably from 50° C. to 105° C.

When the melting point of the crystalline polyester resin is within the above range, the toner is easily melted at the time of fixing and low-temperature fixability is improved. Further, in the process of cooling the toner melt, recrystallization of the crystalline polyester resin is facilitated, the heat resistance of the fixed image is improved, and the resistance to adhesion of ejected paper is further improved. In addition, the storage stability of the toner is improved.

The melting point of the crystalline polyester resin is more preferably from 60° C. to 100° C., and still more preferably from 75° C. to 100° C.

The amount of the crystalline polyester resin in the toner is preferably from 1.0 part by mass to 15.0 parts by mass, and more preferably from 2.0 parts by mass to 10.0 parts by mass with respect to 100.0 parts by mass of the binder resin.

When the amount of the crystalline polyester resin is within the above range, a sufficient plasticizing effect of the binder resin is obtained, the crystalline polyester resin is likely to be finely dispersed in the toner particle, and the low-temperature fixability is further improved.

The weight average molecular weight (Mw) of the crystalline polyester resin is preferably from 6500 to 15,000.

The crystalline polyester resin is preferably a polycondensate of an alcohol including an aliphatic diol having 2 to 23 carbon atoms and a carboxylic acid including an aliphatic dicarboxylic acid having 3 to 24 carbon atoms.

The crystalline polyester resin is more preferably a polycondensate of an alcohol including from 80 mol % to 100 mol % (more preferably from 85 mol % to 100 mol %) of an aliphatic diol having 4 to 12 carbon atoms with respect to all the alcohols constituting the crystalline polyester resin, and a carboxylic acid including from 80 mol % to 100 mol % (more preferably from 85 mol % to 100 mol %) of an aliphatic dicarboxylic acid having 4 to 20 carbon atoms with respect to all the carboxylic acids constituting the crystalline polyester resin.

The aliphatic diol is preferably a linear aliphatic diol, and examples thereof include 1,4-butanediol, 1,5-pentanediol, 1,6-hexanediol, 1,7-heptanediol, 1,8-octanediol, 1,9-nonanediol, 1,10-decanediol, 1,12-dodecanediol, and derivatives thereof. The derivatives are not particularly limited as long as a similar resin structure can be obtained by polycondensation. For example, a derivative obtained by esterifying the diol can be mentioned.

Meanwhile, alcohols other than the aliphatic diols can be used in combination with the abovementioned alcohol.

Examples of the dihydric alcohol among the alcohols include aromatic alcohols such as polyoxyethylenated bisphenol A and polyoxypropylenated bisphenol A; 1,4-cyclohexanedimethanol and the like.

Examples of trihydric or higher alcohols include aromatic alcohols such as 1,3,5-trihydroxymethylbenzene, and aliphatic alcohols such as pentaerythritol, dipentaerythritol, tripentaerythritol, 1,2,4-butanetriol, 1,2,5-pentanetriol, glycerin, 2-methylpropanetriol, 2-methyl-1,2,4-butanetriol, trimethylolethane, trimethylolpropane and the like.

Examples of the monohydric alcohol include n-butanol, isobutanol, sec-butanol, n-hexanol, n-octanol, lauryl alcohol, 2-ethylhexanol, decanol, cyclohexanol, benzyl alcohol, dodecyl alcohol and the like.

Meanwhile, the aliphatic dicarboxylic acid is preferably a linear aliphatic dicarboxylic acid, and examples thereof include malonic acid, succinic acid, glutaric acid, adipic acid, pimelic acid, spermic acid, glutaconic acid, azelaic acid, sebacic acid, hexadecanedioic acid, eicosanedioic acid, derivatives thereof and the like. The derivatives are not particularly limited as long as a similar resin structure can be obtained by polycondensation. For example, acid anhydrides of the abovementioned dicarboxylic acids and derivatives obtained by alkyl esterification or acid chloridation of the dicarboxylic acid component can be mentioned.

Meanwhile, the carboxylic acid other than the aliphatic dicarboxylic acid may be used in combination.

Among the carboxylic acids, examples of the divalent carboxylic acid include aromatic carboxylic acids such as isophthalic acid and terephthalic acid and the like; alicyclic carboxylic acids such as cyclohexanedicarboxylic acid and the like; and acid anhydrides or lower alkyl esters thereof and the like.

Examples of the trivalent or higher carboxylic acid include aromatic acids such as 1,2,4-benzenetricarboxylic acid (trimellitic acid), 2,5,7-naphthalenetricarboxylic acid, 1,2,4-naphthalenetricarboxylic acid, pyromellitic acid and the like; aliphatic carboxylic acids such as 1,2,4-butanetricarboxylic acid, 1,2,5-hexanetricarboxylic acid, 1,3-dicarboxyl-2-methyl-2-methylenecarboxypropane and the like; and acid anhydrides or lower alkyl esters thereof and the like.

Examples of the monovalent carboxylic acid include benzoic acid, naphthalenecarboxylic acid, salicylic acid, 4-methylbenzoic acid, 3-methylbenzoic acid, phenoxyacetic acid, biphenylcarboxylic acid, acetic acid, propionic acid, butyric acid, octanoic acid, decanoic acid, dodecanoic acid, stearic acid and the like.

The crystalline polyester resin can be produced in the same manner as the amorphous polyester resin, that is, according to the polyester synthesis method described above.

In the esterification, transesterification or polycondensation reaction, all the monomers may be charged at once to increase the strength of the obtained crystalline polyester resin. Alternatively, in order to reduce the low-molecular-weight component, a method such as first reacting the divalent monomers, then adding trivalent or higher valent monomers and reacting may be used.

When producing the crystalline polyester resin, it is preferable that the molar ratio of carboxylic acid to alcohol (carboxylic acid/alcohol) as raw material monomers be from 0.80 to 1.20.

In the toner,
where a solubility parameter of the amorphous polyester resin is denoted by $SP_{aPES}$ $(cal/cm^3)^{1/2}$, and a solubility parameter of the crystalline polyester resin is denoted by $SP_{cPES}$ $(cal/cm^3)^{1/2}$, the $SP_{aPES}$ and the $SP_{cPES}$ satisfy the following relationship (4), and the melting point of the crystalline polyester resin is from 75° C. to 100° C.

$$1.00\ (cal/cm^3)^{1/2} \leq (SP_{aPES} - SP_{cPES}) \leq 1.50\ (cal/cm^3)^{1/2} \quad (4)$$

When the $(SP_{aPES} - SP_{cPES})$ is within the above range, the compatibility between the amorphous polyester resin and the crystalline polyester resin is appropriate, the amorphous polyester resin and the crystalline polyester resin are partially compatibilize during storage of the toner, and the deterioration of blocking resistance can be further suppressed. Also, adequate compatibility can be obtained at the time of fixing, and low-temperature fixability can be further improved.

It is more preferable that the $(SP_{aPES} - SP_{cPES})$ be from 1.10 $(cal/cm^3)^{1/2}$ to 1.35 $(cal/cm^3)^{1/2}$.

The solubility parameter (SP value) is a value calculated from the evaporation energy and molar volume of atom and atomic group by Fedors described in the Coating Basics and Engineering (page 53, Yuji Harasaki, Converting Technical Institute, 2010).

The unit of the SP value is $(cal/cm^3)^{1/2}$, but this unit can be converted into the unit of $(J/m^3)^{1/2}$ according to 1 $(cal/cm^3)^{1/2} = 2.046 \times 10^3\ (J/m^3)^{1/2}$.

In the present invention, calculations are made based on the structure of polymer structural units.

The toner particle may include a colorant. Examples of the colorant include known organic pigments or oil dyes, carbon black, magnetic substances and the like.

Cyan colorants can be exemplified by copper phthalocyanine compounds and derivatives thereof, anthraquinone compounds, and base dye lake compounds.

Specific examples include C. I. Pigment Blue 1, 7, 15, 15:1, 15:2, 15:3, 15:4, 60, 62, 66 and the like.

Magenta colorants can be exemplified by condensed azo compounds, diketopyrrolopyrrole compounds, anthraquinone compounds, aquinacridone compounds, basic dye lake compounds, naphthol compounds, benzimidazolone compounds, thioindigo compounds, perylene compounds and the like.

Specific examples include C. I. Pigment Red 2, 3, 5, 6, 7, 23, 48:2, 48:3, 48:4, 57:1, 81:1, 122, 144, 146, 166, 169, 177, 184, 185, 202, 206, 220, 221, 254, C. I. Pigment Violet 19 and the like.

Yellow colorants can be exemplified by condensed azo compounds, isoindolinone compounds, anthraquinone compounds, azo metal complexes, methine compounds, allyl amide compounds and the like.

Specific examples include C. I. Pigment Yellow 12, 13, 14, 15, 17, 62, 74, 83, 93, 94, 95, 97, 109, 110, 111, 120, 127, 128, 129, 147, 151, 154, 155, 168, 174, 175, 176, 180, 181, 191, 194 and the like.

Black colorants can be exemplified by carbon black, magnetic bodies, and those that are adjusted to a black color by using a yellow colorant, a magenta colorant, and a cyan colorant.

These colorants can be used singly or in combination of two or more thereof. The colorants can also be used in the form of a solid solution.

The colorant may be selected from the viewpoints of hue angle, saturation, lightness, lightfastness, OHP transparency, and dispersibility in a toner particle.

The amount of the colorant is preferably from 1 part by mass to 20 parts by mass with respect to 100 parts by mass of the binder resin.

The toner particle may include a releasing agent. Examples of the releasing agent are presented hereinbelow.

Low-molecular polyolefins such as polyethylene and the like; silicones having a melting point; fatty acid amides such as oleic acid amide, erucic acid amide, ricinoleic acid amide, stearic acid amide and the like; ester waxes such as stearyl stearate and the like; vegetable waxes such as carnauba wax, rice wax, candelilla wax, tree wax, jojoba oil and the like; animal waxes such as beeswax and the like; mineral and petroleum waxes such as montan wax, ozokerite, ceresin, paraffin wax, microcrystalline wax, Fischer-Tropsch wax, ester waxes and the like; and modified products thereof.

The releasing agents may be used singly or as a mixture of two or more thereof.

The melting point of the releasing agent is preferably 150° C. or less, more preferably from 40° C. to 130° C., and even more preferably from 40° C. to 110° C.

The amount of the releasing agent is preferably from 1 part by mass to 30 parts by mass with respect to 100 parts by mass of the binder resin.

The toner may include, as necessary, inorganic fine particles.

The inorganic fine particles may be internally added to the toner particles or may be mixed with the toner particles as an external additive.

When the inorganic fine particles are contained as an external additive, inorganic fine particles such as silica fine particles, titanium oxide fine particles and aluminum oxide fine particles are preferable.

The inorganic fine particles are preferably hydrophobized with a hydrophobizing agent such as a silane compound, silicone oil or a mixture thereof.

When the inorganic fine particles are used for improving the flowability of the toner, the specific surface area thereof is preferably from 50 $m^2/g$ to 400 $m^2/g$.

Meanwhile, when the inorganic fine particles are used for improving the durability of the toner, the specific surface area thereof is preferably from 10 $m^2/g$ to 50 $m^2/g$.

In order to achieve both flowability and durability, inorganic fine particles having a specific surface area within the above ranges may be used in combination.

When the inorganic fine particles are contained as an external additive, the amount thereof is preferably from 0.1 parts by mass to 10.0 parts by mass with respect to 100 parts by mass of the toner particles.

A known mixer such as a Henschel mixer may be used for mixing the toner particles and the inorganic fine particles.

The toner may include, as necessary, a charge control agent.

As the charge control agent, a known charge control agent can be used, but a metal compound of an aromatic carboxylic acid which is colorless, has a high charging speed and can stably maintain a constant charge amount is preferable.

Examples of the negative-charging charge control agent include salicylic acid metal compounds, naphthoic acid metal compounds, dicarboxylic acid metal compounds, polymer type compounds having a sulfonic acid or a carboxylic acid in a side chain, polymer type compounds having a sulfonate or a sulfonic acid esterification product in a side chain; polymer type compounds having a carboxylate or a carboxylic acid esterification product as a side chain, boron compounds, urea compounds, silicon compounds, and calixarenes.

Examples of the positive-charging charge control agent include quaternary ammonium salts, polymer type compounds having a quaternary ammonium salt in a side chain, guanidine compounds, and imidazole compounds.

The charge control agent may be internally added to the toner particle or may be mixed with the toner particles as an external additive.

The amount of the charge control agent is preferably from 0.2 parts by mass to 10.0 parts by mass with respect to 100 parts by mass of the binder resin.

A method for producing the toner is not particularly limited, but in order to further improve the dispersibility of the crystalline polyester resin and further exert the effect of the present invention, a pulverization method is preferably used.

Hereinafter, a method for producing a toner by using a pulverization method will be described, but this method is not limiting.

First, in a raw material mixing step, predetermined amounts of a binder resin and a crystalline polyester resin, and, if necessary, a releasing agent and a colorant, are weighed, blended, and mixed as toner raw materials.

Examples of the apparatus suitable for the mixing include HENSCHEL MIXER (manufactured by Nippon Coke & Engineering Co., Ltd.); SUPER MIXER (manufactured by Kawata Mfg. Co., Ltd.); RIBOCONE (manufactured by Okawara Mfg. Co., Ltd.); NAUTA MIXER, TURBULIZER, and CYCLOMIX (manufactured by Hosokawa Micron Corporation); SPIRAL PIN MIXER (manufactured by Pacific Machinery & Engineering Co., Ltd.); and Loedige mixer (manufactured by Matsubo Corporation).

Next, the resultant mixture is melt-kneaded to melt the resins, and a releasing agent, a colorant, and the like are dispersed therein (melt-kneading step).

Examples of the apparatus suitable for the melt-kneading include a TEM type extruder (manufactured by Toshiba Machine Co., Ltd.); a TEX twin-screw kneader (manufactured by Japan Steel Works, Ltd.); a PCM kneader (manufactured by Ikegai Iron Works Co., Ltd.); KNEADEX (manufactured by Mitsui Mining Co., Ltd.), and the like. Continuous kneading machines such as single-screw or twin-screw extruders are preferred over batch type kneaders because continuous production can be performed.

Next, the obtained melt-kneaded material is rolled with two rolls or the like and cooled by water cooling or the like.

The resulting cooled product is pulverized to the desired particle size. First, the cooled product is coarsely pulverized by a crusher, a hammer mill, a feather mill or the like. Thereafter, toner particles are obtained by additional fine pulverization with a KRYPTRON system (manufactured by Kawasaki Heavy Industries, Ltd.), SUPER ROTOR (manufactured by Nisshin Engineering Co., Ltd.) and the like.

The obtained toner particles are classified to a desired particle size. Examples of equipment used for classification include TURBOPLEX, FACULTY, TSP, and TTSP (manufactured by Hosokawa Micron Corporation); and ELBOW JET (manufactured by Nittetsu Mining Co., Ltd.).

The classified toner particles may be used as a toner, and if necessary, inorganic particles or the like may be externally added to obtain a toner.

A method for externally adding inorganic fine particles and the like can be exemplified by a method in which predetermined amounts of toner particles and inorganic fine particles are blended and the particles are stirred and mixed using a high-speed stirrer that applies a shear force to the powder, such as HENSCHEL MIXER and MECHANO HYBRID (manufactured by Nippon Coke & Engineering Co., Ltd.); and SUPER MIXER and NOBILTA (manufactured by Hosokawa Micron Corporation).

If necessary, a sieving machine, for example, such as ULTRASONIC (manufactured by Koei Sangyo Co., Ltd.), RESONASIEVE and GYROSIFTER (manufactured by Tokuju Corporation); TURBO SCREENER (manufactured by Turbo Kogyo Co., Ltd.), and HIVOLTER (manufactured by Toyo Hitec Co., Ltd.), may be used in order to sieve coarse particles or the like.

The toner can also be used as a one-component developer, but in order to further improve dot reproducibility and to supply a stable image for a long period of time, the toner can be mixed with a magnetic carrier and used as a two-component developer.

Generally well-known magnetic carriers can be used, examples thereof including iron oxides; metal particles such as iron, lithium, calcium, magnesium, nickel, copper, zinc, cobalt, manganese, chromium, and rare earths, alloy particles thereof, oxide particles thereof; magnetic bodies such as ferrites; magnetic body-dispersed resin carriers (so-called resin carrier) including magnetic bodies and a binder resin that holds the magnetic bodies in a dispersed state; and the like.

When the toner is mixed with a magnetic carrier and used as a two-component developer, the mixing ratio of the magnetic carrier and the toner is such that the toner concentration in the two-component developer is preferably from 2% by mass to 15% by mass, and more preferably from 4% by mass to 13% by mass.

Hereinafter, methods for measuring various physical properties of the toner and the raw materials will be described.

Method for Separating Amorphous Polyester Resin and Crystalline Polyester Resin

The toner is placed in methyl ethyl ketone (MEK), allowed to stand for several hours at 25° C., and shaken thoroughly. The toner and MEK are well mixed and allowed to stand for at least 12 h until there is no coalescence of the sample.

The resulting solution is centrifuged at 3500 rpm for 20 min (centrifuge "H-18", manufactured by Kokusan Co., Ltd.), and the supernatant liquid and the solid fraction are thereafter recovered and dried.

The sample obtained by drying the supernatant liquid is thoroughly mixed with hexane under heating at 60° C., and then an amorphous polyester resin is obtained from the solid fraction separated by centrifuging.

Further, a sample obtained by drying the solid fraction obtained by centrifuging from the mixture of the toner and MEK is dissolved in MEK under heating at 75° C., and a crystalline polyester resin is obtained from the supernatant liquid separated by centrifuging.

Method for Measuring Molecular Weight of Crystalline Polyester Resin

The molecular weight of the crystalline polyester resin is measured in the following manner by gel permeation chromatography (GPC).

Firstly, 50 mg of a sample is placed in 5 mL of chloroform and allowed to stand for several hours at 25° C., followed by thorough shaking. The sample and chloroform are well mixed and allowed to stand for at least 24 h until there is no coalescence of the sample.

Then, the obtained solution is filtered through a solvent-resistant membrane filter "MAISHORI DISK H-25-5" (manufactured by Tosoh Corporation) having a pore diameter of 0.5 µm to obtain a sample solution.

The measurement is conducted under the following conditions by using the sample solution.
Apparatus: High-speed GPC apparatus "LABSOLUTIONS GPC" (manufactured by Shimadzu Corporation)
Column: PLgel 5 µm MIXED-C 300 mm×7.5 mm (manufactured by Agilent Technologies): 2, and PLgel 5 µm Guard 50 mm×7.5 mm (manufactured by Agilent Technologies): 1
Eluent: chloroform
Flow velocity: 1.0 mL/min
Oven temperature: 45° C.
Sample injection amount: 60 µL
Detector: RI (refractive index) detector To calculate the molecular weight of the sample, a molecular weight calibration curve prepared using standard polystyrene resins (trade name "TSK Standard Polystyrene F-850, F-450, F-288, F-128, F-80, F-40, F-20, F-10, F-4, F-2, F-1, A-5000, A-2500, A-1000, A-500" manufactured by Tosoh Corporation) is used, and the weight average molecular weight (Mw), number average molecular weight (Mn), and peak molecular weight (Mp) are calculated.

Method for Measuring Molecular Weight of Amorphous Polyester Resin

The molecular weight of the amorphous polyester resin is measured in the following manner by gel permeation chromatography (GPC).

First, the sample is placed in tetrahydrofuran (THF), allowed to stand at 25° C. for several hours, then sufficiently shaken, thoroughly mixed with THF and allowed to stand for 12 h or more until there is no coalescence of the sample.

Then, the obtained solution is filtered through a solvent-resistant membrane filter "MAISHORI DISK" (manufactured by Tosoh Corporation) having a pore diameter of 0.5 µm to obtain a sample solution.

The sample solution is adjusted so that the concentration of the component soluble in THF is 0.8% by mass. This sample solution is used to perform measurements under the following conditions.
Apparatus: High-speed GPC apparatus "HLC-8220 GPC" (manufactured by Tosoh Corporation)
Column: Shodex GPC KF-801, 802, 803, 804, 805, 806, 807, 800P (manufactured by Showa Denko KK)
Eluent: THF
Flow velocity: 1.0 mL/min
Oven temperature: 40° C.
Sample injection amount: 100 µL
Detector: RI (refractive index) detector To calculate the molecular weight of the sample, a molecular weight calibration curve prepared using standard polystyrene resins (trade name "TSK Standard Polystyrene F-850, F-450, F-288, F-128, F-80, F-40, F-20, F-10, F-4, F-2, F-1, A-5000, A-2500, A-1000, A-500" manufactured by Tosoh Corporation) is used, and the weight average molecular weight (Mw), number average molecular weight (Mn), and peak molecular weight (Mp) are calculated.

Determination of Structure of Resins, Etc.

The following method is used for determining the structure of resins and the like.

Spectral measurement of $^1$H-NMR and $^{13}$C-NMR is carried out using ECA-400 (400 MHz) manufactured by JEOL Ltd.

The measurement is carried out at 25° C. in a deuterated solvent including tetramethylsilane as an internal standard substance.

The chemical shift value is shown as a ppm shift value (δ value) with tetramethylsilane, which is an internal standard substance, being 0.

Method for Measuring Melting Point of Releasing Agent and Crystalline Polyester Resin The melting points of the releasing agent and the crystalline polyester resin are measured according to ASTM D 3418-82 by using a differential scanning calorimeter "Q1000" (manufactured by TA Instruments).

The melting points of indium and zinc are used for the temperature correction of the apparatus detection unit, and the heat of melting of indium is used for correction of the calorific value.

Specifically, 5 mg of the sample is precisely weighed and placed in a silver pan. An empty silver pan is used as a reference. In one cycle of measurement, the temperature is raised from the measurement starting temperature of 20° C. to the measurement ending temperature of 180° C. at a heating rate of 10° C./min. The peak temperature of the maximum endothermic peak of the DSC curve in the temperature range from 20° C. to 180° C. in the first temperature rising process is obtained.

The peak temperature of the maximum endothermic peak is taken as the melting point.

In the case where the toner is used as a sample, the following method is used for discriminating the endothermic peak of the releasing agent and the endothermic peak of the crystalline polyester resin.

The releasing agent is extracted by Soxhlet extraction using a hexane solvent from the toner, the differential scanning calorimetry of the releasing agent alone is carried out by the above method, and the obtained endothermic peak and the endothermic peak of the toner are compared.

Method for Measuring Glass Transition Temperature (Tg) of Toner and Resin

The glass transition temperatures of the toner and the resin are measured according to ASTM D 3418-82 by using a differential scanning calorimeter "Q1000" (manufactured by TA Instruments).

The melting points of indium and zinc are used for the temperature correction of the apparatus detection unit, and the heat of melting of indium is used for correction of the calorific value.

Specifically, 5 mg of the resin composition is precisely weighed and placed in a silver pan, an empty silver pan is used as a reference, and the measurement is performed in a measurement range from 30° C. to 180° C. at a heating rate of 10° C./min.

The temperature is raised from 30° C. to 180° C. at a rate of 10° C./min and held for 10 min, followed by cooling from 180° C. to 30° C. at a rate of 10° C./min.

Thereafter, the temperature is raised again from 30° C. to 180° C. at a rate of 10° C./min.

In this second heating process, a specific heat change is obtained in the range from 30° C. to 180° C.

The temperature at the point where the straight line equidistant, in the vertical line direction, from the straight line which is an extension of the baseline before and after the specific heat change appears intersects with the curve of the stepwise change portion in the DSC curve is taken as the glass transition temperature (Tg: ° C.).

Method for Measuring Softening Point (Tm) of Resin

The softening point (Tm) of the resin is measured by using a constant load extrusion type capillary rheometer "Flow Characteristic Evaluation Apparatus: Flow Tester CFT-500D" (manufactured by Shimadzu Corporation).

In the CFT-500D, the temperature of the measurement sample filled in a cylinder is raised to melt the sample while applying a constant load by a piston from above the sample, the melt is extruded from the capillary hole at the bottom of the cylinder, and a flow curve can be obtained in the form of a graph from the piston descent amount (mm) and the temperature (° C.) at this time.

In the present invention, "the melting temperature in the ½ method" described in the manual attached to "Flow Characteristic Evaluation Apparatus: Flow Tester CFT-500D" is taken as the softening point (Tm).

The melting temperature in the ½ method is calculated in the following manner.

First, ½ of the difference between the descent amount of the piston at the time when the outflow has ended (outflow end point, Smax) and the descent amount of the piston at the time when the outflow has started (minimum point, Smin) is determined (this is taken as X. X=(Smax−Smin)/2). The temperature in the flow curve at which the descent amount of the piston is the sum of X and Smin is taken as the melting temperature in the ½ method.

A measurement sample is prepared by compression molding 1.2 g of the resin for 60 sec at about 10 MPa by using a tablet compacting compressor (standard manual type Newton Press NT-100H, manufactured by NPa SYSTEM CO., LTD.) in an environment at 25° C. to obtain a columnar shape with a diameter of 8 mm.

Specific operations in the measurement are performed according to the manual provided with the device.

Measurement conditions of CFT-500D are as follows.
Test mode: temperature rise method
Start temperature: 40° C.
Temperature reached: 200° C.
Measurement interval: 1.0° C.
Heating rate: 4.0° C./min
Piston cross section area: 1.000 cm$^2$
Test load (piston load): 5.0 kgf
Preheating time: 300 sec
Die hole diameter: 1.0 mm
Die length: 1.0 mm Method for Measuring Weight Average Particle Diameter of Toner The weight average particle diameter of the toner is calculated by using a precision particle diameter distribution measuring apparatus "Coulter Counter Multisizer 3" (registered trademark, manufactured by Beckman Coulter, Inc.) equipped with a 100-μm aperture tube having a pore size and based on a pore electric resistance method and also the dedicated software "Beckman Coulter Multisizer 3 Version 3.51" (manufactured by Beckman Coulter, Inc.) for setting measurement conditions and performing measurement data analysis, performing the measurement with 25,000 effective measurement channels, and analyzing the measurement data.

A solution prepared by dissolving special grade sodium chloride in ion exchanged water to a concentration of about 1% by mass, for example, "ISOTON II" (manufactured by Beckman Coulter, Inc.), can be used as the electrolytic aqueous solution to be used for measurements.

The dedicated software is set up in the following manner before the measurement and analysis.

The total count number in a control mode is set to 50,000 particles on a "CHANGE STANDARD MEASUREMENT METHOD (SOM) SCREEN" in the dedicated software, the number of measurements is set to 1, and a value obtained using "standard particles 10.0 µm" (manufactured by Beckman Coulter, Inc.) is set as a Kd value. The threshold and the noise level are automatically set by pressing the measurement button of the threshold/noise level. Further, the current is set to 1600 µA, the gain is set to 2, the electrolytic solution is set to ISOTON II, and "FLUSH OF APERTURE TUBE AFTER MEASUREMENT" is checked.

In the "PULSE TO PARTICLE DIAMETER CONVERSION SETTING SCREEN" of the dedicated software, the bin interval is set to a logarithmic particle diameter, the particle diameter bin is set to a 256-particle diameter bin, and a particle diameter range is set from 2 µm to 60 µm.

A specific measurement method is described hereinbelow.

(1) Approximately 200 mL of the electrolytic aqueous solution is placed in a glass 250 mL round-bottom beaker dedicated to Multisizer 3, the beaker is set in a sample stand, and stirring with a stirrer rod is carried out counterclockwise at 24 rpm. Dirt and air bubbles in the aperture tube are removed by the "FLUSH OF APERTURE TUBE" function of the dedicated software.

(2) Approximately 30 ml of the electrolytic aqueous solution is placed in a glass 100 mL flat-bottom beaker. Then, about 0.3 mL of a diluted solution obtained by 3-fold mass dilution of "CONTAMINON N" (10% by mass aqueous solution of a neutral detergent for washing precision measuring instruments of pH 7 consisting of a nonionic surfactant, an anionic surfactant, and an organic builder, manufactured by Wako Pure Chemical Industries, Ltd.) with ion exchanged water is added.

(3) A predetermined amount of ion exchanged water is placed in the water tank of an ultrasonic disperser "Ultrasonic Dispersion System Tetora 150" (manufactured by Nikkaki Bios Co., Ltd.) with an electrical output of 120 W in which two oscillators with an oscillation frequency of 50 kHz are built in with a phase shift of 180 degrees, and about 2 mL of CONTAMINON N is added to the water tank.

(4) The beaker of (2) hereinabove is set in the beaker fixing hole of the ultrasonic disperser, and the ultrasonic disperser is actuated. Then, the height position of the beaker is adjusted so that the resonance state of the liquid surface of the electrolytic aqueous solution in the beaker is maximized.

(5) About 10 mg of the toner is added little by little to the electrolytic aqueous solution and dispersed therein in a state in which the electrolytic aqueous solution in the beaker of (4) hereinabove is irradiated with ultrasonic waves. Then, the ultrasonic dispersion process is further continued for 60 sec. In the ultrasonic dispersion, the water temperature in the water tank is appropriately adjusted to a temperature from 10° C. to 40° C.

(6) The electrolytic aqueous solution of (5) hereinabove in which the toner is dispersed is dropped by using a pipette into the round bottom beaker of (1) hereinabove which has been set in the sample stand, and the measurement concentration is adjusted to be about 5%. Then, measurement is conducted until the number of particles to be measured reaches 50,000.

(7) The measurement data are analyzed with the dedicated software provided with the device, and the weight average particle diameter is calculated.

Method for Measuring Acid Value

Basic operations performed when measuring an acid value are based on JIS K-0070.

Specifically, the acid value is obtained by the following method.

1) A total of 0.5 g to 2.0 g of a sample is accurately weighed. The mass at this time is denoted by M (g).

2) The sample is placed in a 50 mL beaker and dissolved by adding 25 mL of a tetrahydrofuran/ethanol mixed solution (2/1).

3) Titration is performed with a potentiometric titration measuring apparatus (automatic titration measuring apparatus "COM-2500", manufactured by Hiranuma Sangyo Co., Ltd.) by using 0.1 mol/L of an ethanol solution of KOH.

4) The amount of KOH solution used at this time is denoted by S (mL). A blank is measured at the same time, and the amount of KOH used at this time is denoted by B (mL).

5) The acid value is calculated according to the following formula. Here, f is a factor of the KOH solution.

$$\text{Acid value [mg KOH/g]} = (S-B) \times f \times 5.61/M.$$

EXAMPLES

Hereinafter, the present invention will be described in greater detail by way of examples and comparative examples, but embodiments of the present invention are not limited thereto. In the examples and comparative examples, "parts" and "%" are all based on mass unless otherwise specified.

Production Example of Crystalline Polyester Resin C1

Succinic acid: 36.9 parts (0.31 mol; 100.0 mol % of the total number of moles of alcohol)

1,12-Dodecanediol: 63.1 parts (0.31 mol; 100.0 mol % of the total number of moles of carboxylic acid)

Tin 2-ethylhexanoate: 0.5 parts

The above materials were weighed into a reaction vessel equipped with a cooling tube, a stirrer, a nitrogen introduction tube, and a thermocouple.

After replacing the interior of the reaction vessel with nitrogen gas, the temperature was gradually raised under stirring, and the reaction was carried out for 3 h under stirring at a temperature of 140° C.

Next, the pressure inside the reaction vessel was lowered to 8.3 kPa, the temperature was raised to 200° C. under stirring, and the reaction was carried out for 1 h to obtain a crystalline polyester resin C1.

The weight average molecular weight (Mw), melting point, SP value, and acid value of the obtained crystalline polyester resin C1 are shown in Table 1.

Production Example of Crystalline Polyester Resins C2 to C8

Crystalline polyester resins C2 to C8 were obtained by the same operations as described hereinabove, except that the conditions were appropriately changed so that the types of the carboxylic acid and alcohol and the weight average molecular weight (Mw) of the crystalline polyester resin in the production example of the crystalline polyester resin C1 were such as shown in Table 1.

The weight average molecular weight (Mw), melting point, SP value, and acid value (unit: $(\text{cal/cm}^3)^{1/2}$) of the obtained crystalline polyester resins are shown in Table 1.

TABLE 1

| Crystalline polyester resin No. | Carboxylic acid Type | $C_{Ac}$ | Alcohol Type | $C_{OH}$ | $C_{Ac}/C_{OH}$ or $C_{OH}/C_{Ac}$ | Mw | Acid value mgKOH/g | Melting point °C. | SP value |
|---|---|---|---|---|---|---|---|---|---|
| C1 | Succinic acid | 2 | 1,12-Dodecanediol | 12 | 6.0 | 13800 | 10.2 | 82 | 9.78 |
| C2 | Eicosanedioic acid | 18 | 1,4-Butanediol | 4 | 4.5 | 14200 | 9.8 | 80 | 9.70 |
| C3 | Hexanedecanedioic acid | 14 | 1,4-Butanediol | 4 | 3.5 | 11000 | 11.2 | 92 | 9.88 |
| C4 | Succinic acid | 2 | 1,12-Dodecanediol | 12 | 6.0 | 5300 | 16.8 | 71 | 9.74 |
| C5 | Hexanedecanedioic acid | 14 | 1,4-Butanediol | 4 | 3.5 | 28900 | 4.8 | 102 | 9.85 |
| C6 | Succinic acid | 2 | 1,8-Octanediol | 8 | 4.0 | 12100 | 9.9 | 83 | 9.99 |
| C7 | Adipic acid | 4 | 1,12-Dodecanediol | 12 | 3.0 | 12200 | 10.2 | 78 | 9.90 |
| C8 | Eicosanedioic acid | 18 | 1,6-Hexanediol | 6 | 3.0 | 14300 | 9.8 | 82 | 9.63 |

Production Example of Amorphous Polyester Resin A1

Terephthalic acid: 33.2 parts (0.20 mol; 100.0 mol % of the total number of moles of carboxylic acid)

Polyoxypropylene (2.2)-2,2-bis(4-hydroxyphenyl)propane: 65.2 parts (0.19 mol; 95.0 mol % of the total number of moles of alcohol)

Tin 2-ethylhexanoate (esterification catalyst): 0.5 parts

The above materials were weighed into a reaction vessel equipped with a cooling tube, a stirrer, a nitrogen introduction tube, and a thermocouple.

After replacing the interior of the reaction vessel with nitrogen gas, the temperature was gradually raised under stirring, and the reaction was carried out for 3 h while stirring at a temperature of 140° C.

Next, the pressure inside the reaction vessel was lowered to 8.3 kPa, the temperature was raised to 200° C. under stirring, and the reaction was carried out for 4 h (reaction step 1).

Further, after the pressure in the reaction vessel was gradually released to return to normal pressure, 1.58 parts (0.01 mol; 5.0 mol % of the total number of moles of alcohol) of a monoalcohol (1-decanol) forming the molecular chain terminal shown in Table 2 was added, and the reaction was carried out at 200° C. for 2 h under normal pressure.

Thereafter, the interior of the reaction vessel was depressurized again to 5 kPa or less and the reaction was carried out at 200° C. for 3 h to obtain an amorphous polyester resin A1 (reaction step 2).

Production Example of Amorphous Polyester Resins A2 to A13

Amorphous polyester resins A2 to A13 were obtained by the same operations as described hereinabove, except that the conditions were appropriately changed so that the types of the carboxylic acid, alcohol, monocarboxylic acid, and monoalcohol and the weight average molecular weight (Mw) of the amorphous polyester resin in the production example of the amorphous polyester resin A1 were such as shown in Table 2.

However, in the case of amorphous polyester resins A12 and A13, since the monocarboxylic acid or monoalcohol was not added, the resins were obtained by returning pressure in the reaction vessel to normal pressure after the reaction step 1.

The weight average molecular weight (Mw), glass transition temperature (Tg), acid value, and SP value (unit: $(cal/cm^3)^{1/2}$) of the obtained amorphous polyester resins are shown in Table 2.

TABLE 2

| Amorphous polyester No. | Polycarboxylic acid Type | A mol % | Polyhydric alcohol Type | B mol % | Monocarboxylic acid or monoalcohols Type | C mol % | $C_{aPES}$ | Mw | Tg °C. | Acid value mg KOH/g | SP value |
|---|---|---|---|---|---|---|---|---|---|---|---|
| A1 | Terephthalic acid | 100 | BPA—PO | 95 | 1-Decanol | 5 | 10 | 7000 | 54.2 | 8.3 | 10.97 |
| A2 | Terephthalic acid | 95 | BPA—PO | 100 | Eicosanic acid | 5 | 19 | 6800 | 56.3 | 7.7 | 10.87 |
| A3 | Terephthalic acid Fumaric acid | 60 40 | BPA—PO | 95 | 1-Hexadecanol | 5 | 16 | 7300 | 51.5 | 8.8 | 10.73 |
| A4 | Terephthalic acid | 100 | BPA—EO | 95 | 1-Pentadecanol | 5 | 15 | 7800 | 55.0 | 7.2 | 11.27 |
| A5 | Terephthalic acid | 100 | BPA—EO | 95 | 1-Decanol | 5 | 10 | 7400 | 54.5 | 7.0 | 11.30 |
| A6 | Terephthalic acid | 100 | BPA—PO | 95 | 1-Dodecanol | 5 | 12 | 6900 | 51.6 | 8.5 | 10.93 |
| A7 | Terephthalic acid | 100 | BPA—PO | 95 | Stearyl alcohol | 5 | 18 | 6800 | 50.1 | 8.0 | 10.96 |
| A8 | Terephthalic acid | 100 | BPA—PO | 95 | 1-Decanol | 5 | 10 | 4200 | 43.9 | 18.0 | 10.99 |
| A9 | Terephthalic acid | 100 | BPA—PO | 95 | 1-Decanol | 5 | 10 | 10200 | 67.4 | 4.3 | 10.95 |
| A10 | Terephthalic acid | 100 | BPA—EO | 95 | 1-Hexanol | 5 | 6 | 6900 | 53.8 | 7.7 | 11.29 |

TABLE 2-continued

| Amorphous polyester No. | Polycarboxylic acid | | Polyhydric alcohol | | Monocarboxylic acid or monoalcohols | | | | | Acid value | |
|---|---|---|---|---|---|---|---|---|---|---|---|
| | Type | A mol % | Type | B mol % | Type | C mol % | $C_{aPES}$ | Mw | Tg ° C. | mg KOH/g | SP value |
| A11 | Terephthalic acid | 100 | BPA—PO | 95 | 1-Heneicosanol | 5 | 21 | 7200 | 55.6 | 6.8 | 10.91 |
| A12 | Terephthalic acid Dodecylsuccinic acid | 60 40 | BPA—EO | 100 | — | | | 9000 | 54.8 | 7.5 | 10.59 |
| A13 | Terephthalic acid | 100 | BPA—PO | 100 | — | | | 7500 | 54.4 | 8.0 | 10.99 |

In Table 2,
BPA-PO represents polyoxypropylene (2.2)-2,2-bis(4-hydroxyphenyl)propane,
BPA-EO represents polyoxyethylene (2.2)-2,2-bis(4-hydroxyphenyl)propane,
A represents the molar percentage of the polycarboxylic acid used relative to the total number of moles of all the carboxylic acids used,
B represents the molar percentage of the polyhydric alcohol used relative to the total number of moles of all the alcohols used,
C represents the molar percentage of the monocarboxylic acid or monoalcohol used relative to the total number of moles of all the carboxylic acids or alcohols used.

Production Example of Toner 1

| Amorphous polyester resin A1 | 100 parts |
|---|---|
| Crystalline polyester resin C1 | 7.5 parts |
| Fischer-Tropsch wax (hydrocarbon wax, melting point: 90° C.) | 6 parts |
| C.I. Pigment Blue 15:3 | 7 parts |
| 3,5-Di-t-butyl salicylic acid aluminum compound (Bontron E88 manufactured by Orient Chemical Industries, Ltd.) | 0.3 parts |

The above materials were mixed using a Henschel mixer (Model FM-75, manufactured by Mitsui Mining Co., Ltd.) at a rotation speed of 20 s$^{-1}$ for a rotation time of 5 min. Thereafter, kneading was performed with a twin-screw kneader (PCM-30 type, manufactured by Ikegai Corporation) set at a temperature of 130° C.

The obtained kneaded product was cooled and roughly pulverized to 1 mm or less with a hammer mill to obtain a coarsely pulverized material.

The obtained coarsely pulverized material was finely pulverized with a mechanical pulverizer (T-250, manufactured by Turbo Kogyo Co., Ltd.).

Further, classification was carried out using FACULTY F-300 (manufactured by Hosokawa Micron Corporation) to obtain toner particles 1. The operating conditions of FACULTY F-300 were as follows: classification rotor rotation speed was set to 130 s$^{-1}$ and dispersion rotor rotation speed was set to 120 s$^{-1}$.

A total of 100 parts of the obtained toner particles, 1.0 part of hydrophobic silica fine particles (BET: 200 m$^2$/g) hydrophobized with hexamethyldisilazane, and 1.0 part of titanium oxide fine particles (BET: 80 m$^2$/g) surface-treated with isobutyltrimethoxysilane were mixed using a Henschel mixer (model FM-75, manufactured by Mitsui Miike Machinery Co., Ltd.) at a rotation speed of 30 s$^{-1}$ and a rotation time of 10 min to obtain a toner 1.

Production Examples of Toners 2 to 9 and Comparative Toners 1 to 9

Toners 2 to 9 and comparative toners 1 to 9 were obtained by the same operations as described hereinabove, except that the types of the amorphous polyester resin and the crystalline polyester resin in the production example of toner 1 were changed as shown in Table 3.

TABLE 3

| Toner No. | Amorphous polyester | Crystalline polyester | $\lvert C_{OH} - C_{aPES} \rvert$ or $\lvert C_{Ac} - C_{aPES} \rvert$ | $SP_{aPES} - SP_{cPES}$ | Tg ° C. |
|---|---|---|---|---|---|
| 1 | A1 | C1 | $\lvert C_{OH} - C_{aPES} \rvert = 2$ | 1.19 | 49.3 |
| 2 | A2 | C2 | $\lvert C_{Ac} - C_{aPES} \rvert = 1$ | 1.17 | 52.1 |
| 3 | A3 | C3 | $\lvert C_{Ac} - C_{aPES} \rvert = 2$ | 0.85 | 48.5 |
| 4 | A4 | C2 | $\lvert C_{Ac} - C_{aPES} \rvert = 3$ | 1.57 | 50.7 |
| 5 | A1 | C4 | $\lvert C_{OH} - C_{aPES} \rvert = 2$ | 1.23 | 49.7 |
| 6 | A4 | C5 | $\lvert C_{Ac} - C_{aPES} \rvert = 1$ | 1.42 | 49.9 |
| 7 | A5 | C6 | $\lvert C_{OH} - C_{aPES} \rvert = 2$ | 1.31 | 49.8 |
| 8 | A6 | C1 | $\lvert C_{OH} - C_{aPES} \rvert = 0$ | 1.15 | 48.3 |
| 9 | A7 | C2 | $\lvert C_{Ac} - C_{aPES} \rvert = 0$ | 1.26 | 47.8 |
| C.T. 1 | A8 | C1 | $\lvert C_{OH} - C_{aPES} \rvert = 2$ | 1.21 | 39.3 |
| C.T. 2 | A9 | C1 | $\lvert C_{OH} - C_{aPES} \rvert = 2$ | 1.17 | 61.5 |
| C.T. 3 | A10 | C6 | $\lvert C_{OH} - C_{aPES} \rvert = 2$ | 1.30 | 48.7 |
| C.T. 4 | A11 | C2 | $\lvert C_{Ac} - C_{aPES} \rvert = 3$ | 1.21 | 52.1 |
| C.T. 5 | A5 | C7 | $\lvert C_{OH} - C_{aPES} \rvert = 2$ | 1.40 | 48.4 |
| C.T. 6 | A2 | C8 | $\lvert C_{Ac} - C_{aPES} \rvert = 1$ | 1.24 | 52.2 |
| C.T. 7 | A1 | C3 | $\lvert C_{Ac} - C_{aPES} \rvert = 4$ | 1.09 | 48.3 |
| C.T. 8 | A12 | C1 | — | 0.81 | 50.3 |
| C.T. 9 | A13 | C1 | — | 1.21 | 49.8 |

In the table, C.T. denotes "comparative toner".
Production Example of Magnetic Core Particle 1
Step 1 (Weighing and Mixing Step):

| $Fe_2O_3$ | 62.7 parts |
|---|---|
| $MnCO_3$ | 29.5 parts |
| $Mg(OH)_2$ | 6.8 parts |
| $SrCO_3$ | 1.0 part |

Ferrite raw materials were weighed so as to obtain the above composition ratio of the abovementioned materials.

Thereafter, the materials were pulverized and mixed for 5 h with a dry vibration mill using stainless steel beads having a diameter of ⅛ inch.

Step 2 (Pre-Calcination Step):

The pulverized product obtained was made into about 1 mm square pellets with a roller compactor.

These pellets were subjected to removal of coarse powder with a vibrating sieve having an opening of 3 mm, then fine powder was removed with a vibrating sieve having an opening of 0.5 mm, and pre-calcined ferrite was prepared by calcining at a temperature of 1000° C. for 4 h under a nitrogen atmosphere (oxygen concentration: 0.01% by volume) by using a burner-type calcination furnace.

The obtained pre-calcined ferrite had the following composition.

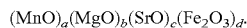

$(MnO)_a(MgO)_b(SrO)_c(Fe_2O_3)_d$.

In the above formula, a=0.257, b=0.117, c=0.007, and d=0.393.

Step 3 (Pulverization Step):

After pulverizing to about 0.3 mm with a crusher, 30 parts of water was added to 100 parts of the pre-calcined ferrite and pulverization was carried out for 1 h by using a wet ball mill with zirconia beads having a diameter of ⅛ inch. The obtained slurry was pulverized with a wet ball mill using alumina beads having a diameter of 1/16 inch for 4 h to obtain a ferrite slurry (finely pulverized product of pre-calcined ferrite).

Step 4 (Granulation Step):

A total of 1.0 part of ammonium polycarboxylate as a dispersing agent and 2.0 parts of polyvinyl alcohol as a binder were added, with respect to 100 parts of the pre-calcined ferrite, to the ferrite slurry, followed by granulation into spherical particles with a spray drier (manufacturer: Ohkawara Kakohki Co., Ltd.).

The obtained particles were adjusted in particle size and then heated at 650° C. for 2 h using a rotary kiln to remove organic components of the dispersing agent and the binder.

Step 5 (Calcination Step):

In order to control the calcination atmosphere, the temperature was raised in an electric furnace from room temperature to 1300° C. under a nitrogen atmosphere (oxygen concentration 1.00% by volume) in 2 h and then calcination was carried out at a temperature of 1150° C. for 4 h. The temperature was then lowered to 60° C. over 4 h, the air atmosphere was restored from the nitrogen atmosphere, and the product was taken out at a temperature of 40° C. or lower.

Step 6 (Screening Step):

After disaggregating the aggregated particles, a low-magnetic-force product was cut by magnetic separation, and the coarse particles were removed by sieving with a sieve having a mesh size of 250 μm to obtain magnetic core particles 1 having a 50% particle diameter (D50) based on volume distribution of 37.0 μm.

Preparation of Coating Resin 1

| | |
|---|---|
| Cyclohexyl methacrylate monomer | 26.8% by mass |
| Methyl methacrylate monomer | 0.2% by mass |
| Methyl methacrylate macromonomer | 8.4% by mass |
| (macromonomer having methacryloyl group at one end and a weight average molecular weight of 5000) | |
| Toluene | 31.3% by mass |
| Methyl ethyl ketone | 31.3% by mass |
| Azobisisobutyronitrile | 2.0% by mass |

Of the above materials, cyclohexyl methacrylate monomer, methyl methacrylate monomer, methyl methacrylate macromonomer, toluene, and methyl ethyl ketone were placed in a four-necked separable flask equipped with a reflux condenser, a thermometer, a nitrogen introduction tube, and a stirrer. Nitrogen gas was introduced into the flask to obtain a sufficiently nitrogen atmosphere, followed by heating to 80° C.

Thereafter, azobisisobutyronitrile was added and refluxing and polymerization were conducted for 5 h.

Hexane was injected into the resulting reaction product to precipitate and deposit the copolymer, and the precipitate was filtered off and vacuum dried to obtain a coating resin 1.

A total of 30 parts of the coating resin 1 thus obtained was dissolved in 40 parts of toluene and 30 parts of methyl ethyl ketone to obtain a polymer solution 1 (resin solid fraction concentration: 30% by mass).

Preparation of Coating Resin Solution 1

| | |
|---|---|
| Polymer solution 1 (resin solid fraction concentration: 30% by mass) | 33.3% by mass |
| Toluene | 66.4% by mass |
| Carbon black (REGAL 330; manufactured by Cabot Corporation) (primary particle diameter 25 nm, nitrogen adsorption specific surface area 94 m²/g, DBP oil absorption amount 75 ml/100 g) | 0.3% by mass |

The abovementioned materials were dispersed for 1 h with a paint shaker using zirconia beads having a diameter of 0.5 mm. The resulting dispersion was filtered with a membrane filter of 5.0 μm to obtain a coating resin solution 1.

Production Example of Magnetic Carrier 1
Resin Coating Step:

The coating resin solution 1 was loaded into a vacuum degassing type kneader maintained at normal temperature in an amount of 2.5 parts as a resin component with respect to 100 parts of magnetic core particles 1.

After loading, the components were stirred at a revolution speed of 30 rpm for 15 min. After the solvent was volatilized to a certain extent (80% by mass) or more, the temperature was raised to 80° C. while mixing under reduced pressure, and toluene was distilled off over 2 h, followed by cooling.

The obtained magnetic carrier was subjected to fractionation of a low-magnetic-force product by magnetic separation, sieving with a sieve having a mesh size of 70 μm, and classification with an air classifier to obtain a magnetic carrier 1 having a 50% particle diameter (D50) based on volume distribution of 38.2 μm.

Production Example of Two-Component Developer 1

A total of 8.0 parts of the toner 1 was added to 92.0 parts of the magnetic carrier 1 and mixed with a V-type mixer (V-20, manufactured by Seishin Enterprise Co., Ltd.) to obtain a two-component developer 1.

Production Examples of Two-Component Developers 2 to 9 and Comparative Two-Component Developers 1 to 9

Two-component developers 2 to 9 and comparative two-component developers 1 to 9 were obtained by performing the same operations as described hereinabove, except that the combination of the toners in the production example of the two-component developer 1 was changed as shown in Table 4.

TABLE 4

| Two-component developer No. | Toner | Carrier |
|---|---|---|
| 1 | Toner 1 | Magnetic carrier 1 |
| 2 | Toner 2 | Magnetic carrier 1 |
| 3 | Toner 3 | Magnetic carrier 1 |
| 4 | Toner 4 | Magnetic carrier 1 |
| 5 | Toner 5 | Magnetic carrier 1 |
| 6 | Toner 6 | Magnetic carrier 1 |
| 7 | Toner 7 | Magnetic carrier 1 |
| 8 | Toner 8 | Magnetic carrier 1 |
| 9 | Toner 9 | Magnetic carrier 1 |

TABLE 4-continued

| Two-component developer No. | Toner | Carrier |
|---|---|---|
| C.D. 1 | Comparative toner 1 | Magnetic carrier 1 |
| C.D. 2 | Comparative toner 2 | Magnetic carrier 1 |
| C.D. 3 | Comparative toner 3 | Magnetic carrier 1 |
| C.D. 4 | Comparative toner 4 | Magnetic carrier 1 |
| C.D. 5 | Comparative toner 5 | Magnetic carrier 1 |
| C.D. 6 | Comparative toner 6 | Magnetic carrier 1 |
| C.D. 7 | Comparative toner 7 | Magnetic carrier 1 |
| C.D. 8 | Comparative toner 8 | Magnetic carrier 1 |
| C.D. 9 | Comparative toner 9 | Magnetic carrier 1 |

In the table, C.D. denotes "comparative developer".

A modified printer image RUNNER ADVANCE C9075 PRO for digital commercial printing made by Canon Inc. was used as an image forming apparatus, a two-component developer was placed in a developing device at a cyan position, the DC voltage $V_{DC}$ of the developer carrying member, the charging voltage $V_D$ of the electrostatic latent image bearing member, and the laser power were adjusted so as to obtain the desired toner laid-on level on the electrostatic latent image bearing member or paper, and the below-described evaluation was performed. The modification was a change enabling free setting of the fixing temperature and the process speed.

Evaluation 1: Low-Temperature Fixability
  Paper: CS-680 (A4 paper, 68.0 g/m$^2$)
  (marketed by Canon Marketing Japan Inc.)
  Toner laid-on level: 1.20 mg/cm$^2$
    Evaluation image: an image of 10 cm$^2$ was arranged at the center of the A4 paper
    Fixing test environment: low-temperature and low-humidity environment, 15° C./10% RH (referred to hereinbelow as L/L)
  Process speed: 450 mm/sec
  Fixing temperature: 130° C.
  The image forming apparatus was used to evaluate the low-temperature fixability of the fixed image outputted under the above conditions.

For the evaluation of low-temperature fixability, the following image density reduction rate value was used as an index.

To determine the image density reduction rate, first, the density of the fixed image in the center portion was measured using an X-Rite color reflection densitometer (500 series: manufactured by X-Rite). Next, a fixed image was rubbed (five cycles back and forth) with Silbon paper by applying a load of 4.9 kPa (50 g/cm$^2$) to the portion where the density of the fixed image was measured, and the density of the fixed image was measured again. Then, the reduction rate (%) of the density of the fixed image after rubbing with respect to that before rubbing was measured.

Evaluation Criteria
A: the density reduction rate is less than 2.0%
B: the density reduction rate is from 2.0% to less than 10.0%
C: the density reduction rate is 10.0% or more Evaluation 2: Blocking Resistance A total of 5 g of toner was placed in a 100 mL polypropylene cup and allowed to stand for 48 h in a temperature- and humidity-variable thermostat (55° C., 41% RH). Then, the aggregation property of the toner was evaluated.

For the aggregation property, the residual ratio of the toner remaining after shaking at an amplitude of 0.5 mm for 10 sec with a mesh with an opening of 20 μm with a powder tester PT-X (manufactured by Hosokawa Micron Co., Ltd.) was used as an evaluation index.

Evaluation Criteria
A: residual ratio less than 2.0%
B: residual ratio from 2.0% to less than 15.0%
C: residual ratio is 15.0% or more Evaluation 3: Resistance to Adhesion of Ejected Paper
  Paper: CS-680 (A4 paper, 68.0 g/m$^2$)
  (marketed by Canon Marketing Japan Inc.)
  Toner laid-on level: 1.20 mg/cm$^2$
    Evaluation image: an image of 100 cm$^2$ (10 cm×10 cm) was arranged at the center of the A4 paper
    Fixing test environment: low-temperature and low-humidity environment, 15° C./10% RH (referred to hereinbelow as L/L)
  Process speed: 450 mm/sec
  Fixing temperature: 130° C.

The image forming apparatus was used, two fixed images were outputted under the above conditions, and the outputted sheets were superimposed so that the printed portions thereof matched each other.

A paper bundle (CS-680, 500 sheets) was further placed on the two outputted sheets, the outputted sheets and the paper bundle were placed in a thermostat set at 30° C. and 80% RH, allowed to stand for 1 h, and then allowed to stand for 10 h after resetting the temperature of the thermostat to the following evaluation conditions.

Next, the two outputted sheets were taken out from the thermostat and allowed to cool for 1 h, followed by evaluation as to whether the outputted sheets have adhered to each other when the two outputted sheets were peeled off.

Evaluation Criteria
A: the outputted sheets do not adhere to each other at a thermostat condition temperature of 60° C.
B: the outputted sheets do not adhere to each other at a thermostat condition temperature of 55° C.
C: the outputted sheets do not adhere to each other at a thermostat condition temperature of 50° C.
D: the outputted sheets adhere to each other at a thermostat condition temperature of 50° C., and the outputted sheets are ruptured when strongly peeled off

TABLE 5

| | Low-temperature fixability | Blocking resistance | Resistance to adhesion of ejected paper |
|---|---|---|---|
| Example 1 | A | A | B |
| Example 2 | A | A | B |
| Example 3 | A | B | C |
| Example 4 | B | A | A |
| Example 5 | A | B | C |
| Example 6 | B | A | A |
| Example 7 | A | A | B |
| Example 8 | A | A | A |
| Example 9 | A | A | A |
| C.E. 1 | A | C | C |
| C.E. 2 | C | A | A |
| C.E. 3 | A | B | D |
| C.E. 4 | A | B | D |
| C.E. 5 | A | B | D |
| C.E. 6 | A | B | D |
| C.E. 7 | A | B | D |
| C.E. 8 | A | A | D |
| C.E. 9 | A | B | D |

In the table, C.E. denotes "Comparative example".

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-88149, filed May 1, 2018, which is hereby incorporated by reference herein in its entirety.

What is claimed is:

1. A toner comprising a toner particle including a binder resin and a crystalline polyester resin, wherein
the binder resin is an amorphous polyester resin having a linear alkyl group at a molecular chain terminal,
the crystalline polyester resin is a polycondensate of a diol and a dicarboxylic acid,
where the number of carbon atoms of the linear alkyl group is denoted by $C_{aPES}$, the number of carbon atoms of the diol is denoted by $C_{OH}$, and the number of carbon atoms of the dicarboxylic acid, excluding carbon that belongs to carboxyl groups, is denoted by $C_{Ac}$,
the $C_{aPES}$, the $C_{OH}$, and the $C_{Ac}$ satisfy the following relationships (1), and (2) or (3), and
a glass transition temperature of the toner as measured by a differential scanning calorimeter is from 40.0° C. to 55.0° C.

$$8 \leq C_{aPES} \leq 20 \quad (1)$$

$$C_{Ac}/C_{OH} \geq 3.5 \text{ and } 0 \leq |C_{Ac} - C_{aPES}| \leq 3 \quad (2)$$

$$C_{OH}/C_{Ac} \geq 3.5 \text{ and } 0 \leq |C_{OH} - C_{aPES}| \leq 3. \quad (3)$$

2. The toner according to claim 1, wherein the molecular chain terminal is a group formed by detachment of a hydrogen atom of a hydroxyl group of a linear alkyl monoalcohol or a group formed by detachment of a hydrogen atom of a carboxyl group of a linear alkyl monocarboxylic acid, and
the linear alkyl group is an alkyl group included in the group formed by detachment of a hydrogen atom of a hydroxyl group of a linear alkyl monoalcohol or the group formed by detachment of a hydrogen atom of a carboxyl group of a linear alkyl monocarboxylic acid.

3. The toner according to claim 1, wherein
where a solubility parameter of the amorphous polyester resin is denoted by $SP_{aPES}$ $(cal/cm^3)^{1/2}$, and a solubility parameter of the crystalline polyester resin is denoted by $SP_{cPES}$ $(cal/cm^3)^{1/2}$,
the $SP_{aPES}$ and the $SP_{cPES}$ satisfy the following relationship (4), and
a melting point of the crystalline polyester resin is from 75° C. to 100° C.

$$1.00 \ (cal/cm^3)^{1/2} \leq (SP_{aPES} - SP_{cPES}) \leq 1.50 \ (cal/cm^3)^{1/2}. \quad (4)$$

4. The toner according to claim 1, wherein the $C_{aPES}$, the $C_{OH}$, and the $C_{Ac}$ satisfy the following relationships (1), and (2)' or (3)'

$$8 \leq C_{aPES} \leq 20 \quad (1)$$

$$C_{Ac}/C_{OH} \geq 3.5 \text{ and } C_{Ac} = C_{aPES} \quad (2)'$$

$$C_{OH}/C_{Ac} \geq 3.5 \text{ and } C_{OH} = C_{aPES}. \quad (3)'$$

* * * * *